United States Patent
Foti et al.

(10) Patent No.: US 6,917,612 B2
(45) Date of Patent: Jul. 12, 2005

(54) SYSTEM AND METHOD FOR ADDRESS RESOLUTION IN INTERNET PROTOCOL (IP)-BASED NETWORKS

(75) Inventors: George Foti, Dollard des Ormeaux (CA); Sorin Surdila, Laval (CA)

(73) Assignee: Telefonaktiebolaged L M Ericsson, Stockholm (SE)

( * ) Notice: Subject to any disclaimer, the term of this patent is extended or adjusted under 35 U.S.C. 154(b) by 939 days.

(21) Appl. No.: 09/852,536

(22) Filed: May 11, 2001

(65) Prior Publication Data

US 2002/0027915 A1 Mar. 7, 2002

Related U.S. Application Data

(60) Provisional application No. 60/229,777, filed on Sep. 1, 2000.

(51) Int. Cl.[7] .............................................. H04L 12/66
(52) U.S. Cl. ........................ 370/352; 370/392; 370/410
(58) Field of Search ............................... 370/352, 353, 370/354, 355, 356, 389, 392, 401, 410

(56) References Cited

U.S. PATENT DOCUMENTS

| | | | |
|---|---|---|---|
| 5,522,045 A | 5/1996 | Sandberg | ............... 395/200.08 |
| 5,856,974 A | 1/1999 | Gervais et al. | ............. 370/392 |
| 6,119,171 A | 9/2000 | Alkhatib | ..................... 709/245 |
| 6,477,150 B1 * | 11/2002 | Maggenti et al. | ........... 370/312 |
| 6,654,606 B1 * | 11/2003 | Foti et al. | ..................... 370/392 |
| 6,741,585 B1 * | 5/2004 | Munoz et al. | .............. 370/352 |
| 6,775,277 B1 * | 8/2004 | Li et al. | ..................... 370/389 |
| 2003/0046404 A1 * | 3/2003 | O'Neill et al. | .............. 709/228 |

* cited by examiner

Primary Examiner—Chi Pham
Assistant Examiner—Keith M. George
(74) Attorney, Agent, or Firm—Smith, Danamraj & Youst, P.C.

(57) ABSTRACT

A system and unified method of address resolution in an IP-based network. A Resolver determines whether an input address is a URL/URI, and if so, extracts a domain name. If the input address is an E.164 number, the Resolver converts the E.164 number into a domain name in ENUM format. The Resolver then sends a domain name query to a DNS which, if able, returns the IP address for either a Global MGCF or a destination server along with a supported Application protocol. If the DNS is unable to perform the translation, or the Application protocol returned is not supported by the requesting application, the Resolver sends a domain name query to an extended Location Server (LS) to obtain an IP address of a gateway function capable of interfacing with the destination server.

18 Claims, 5 Drawing Sheets

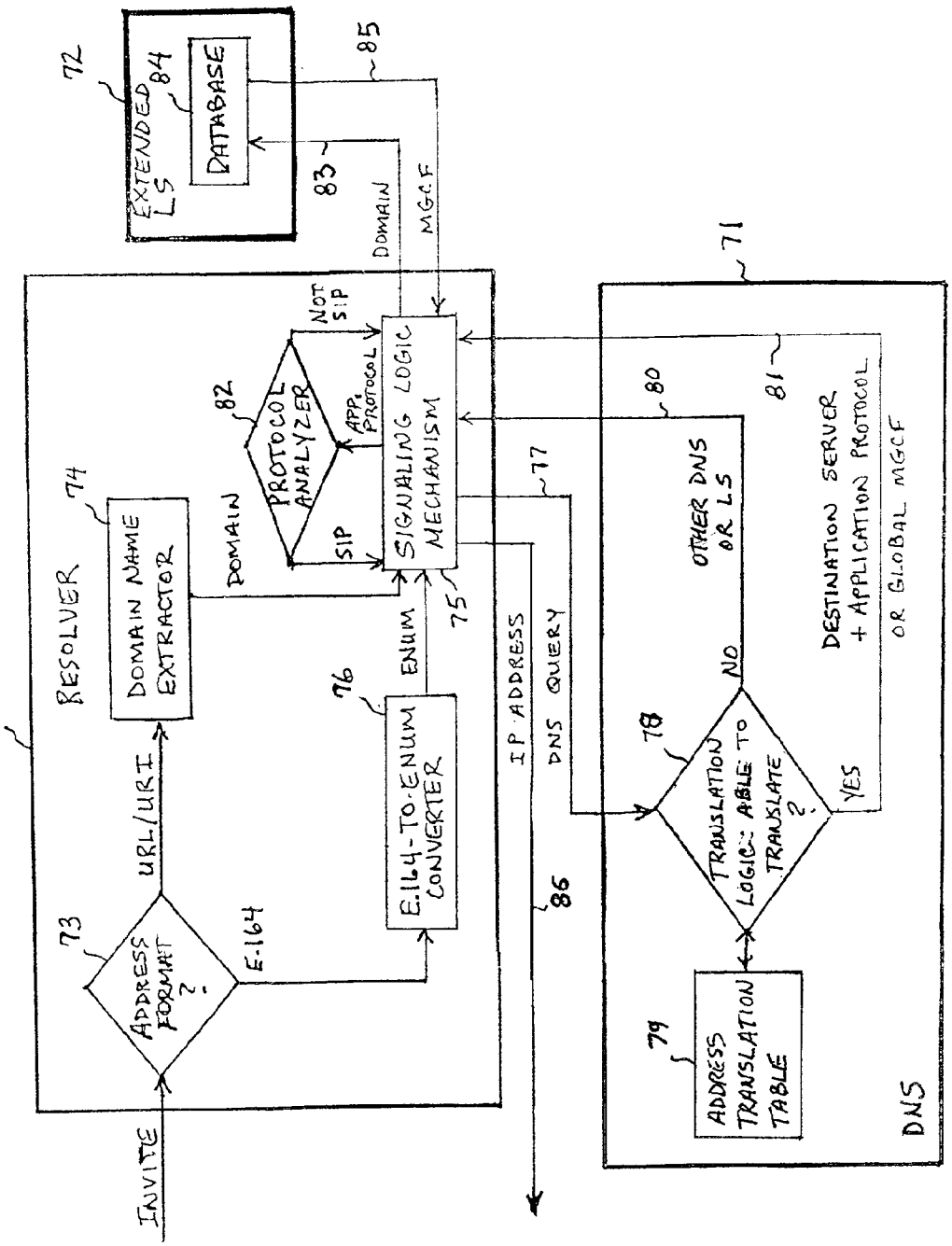

SYSTEM AND METHOD FOR ADDRESS RESOLUTION IN INTERNET PROTOCOL (IP)-BASED NETWORKS

This nonprovisional application claims priority based upon the prior U.S. provisional patent application entitled, "Unified Mechanism for Address Resolution in 3G all IP Networks" application No. 60/229,777, filed Sep. 1, 2000 in the names of George Foti and Sorin Surdila.

BACKGROUND OF THE INVENTION

1. Technical Field of the Invention

This invention relates to telecommunication systems and, more particularly, to a system and method of address resolution in Internet Protocol (IP)-based networks.

2. Description of Related Art

Wireless telecommunication networks are evolving from second generation (2G) circuit-switched networks to third generation (3G) packet-switched networks. A reference architecture for a 3G wireless network is being developed by the Third Generation Partnership Project (3GPP).

Today there are three ways to resolve an address in an IP network: (1) using a Domain Name Server (DNS) to translate an input Uniform Resource Locator/Uniform Resource Identifier (URL/URI) into an IP address, (2) using a Location Server (LS) and the Telephone Routing for IP Protocol (TRIP) Framework to obtain the IP address of a Gateway based on an input E.164 number, and (3) converting an input E.164 number into a domain name in E.164 number (ENUM) format, using the DNS to locate an LS with TRIP capabilities, and obtaining the IP address of a Gateway from the TRIP LS.

The standard addressing mechanism used today for IP networks is based on symbolic names called Uniform Resource Locators (URLs) or Uniform Resource Identifiers (URIs). When an address is entered as a URL/URI, it is translated into an IP address by the public Domain Name System. The Domain Name System is made of servers called Domain Name Servers (DNSs) arranged in a hierarchical structure. If a DNS receives an address query that it cannot resolve, it will typically return the address of a higher level DNS that may be able to resolve the address. Typically the address translation provided by a DNS has a global relevance (i.e., the same IP address is provided regardless of the geographical location of the interrogating node), because the Internet virtually provides global inter-connectivity.

With the introduction of IP telephony, the problem of address resolution was compounded due to the necessity of using classical E.164 numbers, especially for calls routed to and from the Public Switched Telephone Network (PSTN) or the Public Land Mobile Network (PLMN). Calls originating in the PSTN/PLMN and destined for an IP subscriber must be translated from the E.164 number entered by the PSTN/PLMN subscriber to an IP address that is usable in the IP network. Conversely, calls originating in the IP network and destined for the PSTN/PLMN require the use of a Gateway function to perform a protocol translation such as translating from the Session Initiation Protocol (SIP) to Integrated Services User Part (ISUP). The Gateway function also performs a media conversion from packet-switched to circuit-switched transport protocols. As a result, from the IP network perspective, translating an E.164 number requires locating an appropriate Gateway. This is no longer a simple address translation with global relevance, because each operator prefers to have the freedom to chose a Gateway based on the operator's local policies. This means that in one operator's domain, an E.164 number may be translated into the IP address of Gateway-1, whereas, in the domain of another operator, the same E.164 number may be translated into the IP address of Gateway-2.

An alternative method for translating E.164 numbers into IP addresses is currently proposed by the ENUM Internet Engineering Task Force (IETF) working group. This method uses the DNS infrastructure to perform the address resolution, by supplying it with the E.164 number converted into a DNS name. For example, the E.164 number 123 456 7890 may be converted to the DNS name 0.1.2.3.4.5.6.7.8.9. Since the DNS infrastructure is used, the address translation typically has a global relevance. This is useful, for instance, when a PSTN operator decides to connect its network to the IP backbone by installing a SIP-to-ISUP Gateway. A call originated from a SIP subscriber from any geographical location, towards a PSTN subscriber served by this operator, must be routed to the operator's Gateway. Hence, the number series owned by this operator can be converted to the IP address of the Gateway, and this conversion has a global relevance.

Today, it is assumed that when a SIP server needs an address translation for routing purposes, it is able to identify unambiguously what node to interrogate: the DNS or the LS. The current assumptions in 3GPP are:

When a Call State Control Function (CSCF) needs to find a Media Gateway Control Function (MGCF) (the SIP controlling component of a Gateway) in order to go to the PSTN/PLMN, the CSCF interrogates an LS.

When a CSCF needs to find the SIP server that acts as a point of contact in the home network of a called 3GPP subscriber (the Interrogating CSCF or ICSCF), it interrogates a DNS.

In general, URL/URIs are translated by DNSs, and E.164 numbers are translated by LSs.

With the convergence of the telecom and datacom worlds, reflected in the 3G-all-IP networks, the user will be given the freedom to use various addresses to call another party. Moreover, the called party may not only be a SIP or PSTN/PLMN subscriber, but may also be an H.323 subscriber. Adding to this complexity, SIP subscribers and H.323 subscribers may be addressed using either a URL/URI or an E.164 number. The set of currently used assumptions lead to the following addressing problems in a 3G-all-IP network:

When the caller specifies the called party using an E.164 number, it is not known whether the called party is a PSTN/PLMN subscriber, an H.323 subscriber, or a SIP 3GPP Multimedia subscriber. Telephone numbers require translation using a DNS and a TRIP LS; H.323 addresses require translation using a DNS and a non-TRIP LS; and SIP addresses require translation using a DNS only. Therefore, when the Serving CSCF (S-CSCF) of the caller needs to translate the E.164 number, it is not clear which database(s) should be interrogated—a DNS (as described by the ENUM group), a non-TRIP LS, or a TRIP LS (as in the TRIP framework).

If the caller specifies the called party using a URL/URI, the S-CSCF of the caller will automatically interrogate the DNS. However, if the URL/URI is the address of an H.323 subscriber, the DNS will most likely provide the IP address of the called party's Gatekeeper, which is of no use to the caller's S-CSCF since it does not understand the H.323 protocol. In this case the S-CSCF needs to obtain the address of a SIP-H.323 MGCF, and therefore should interrogate the LS. However, there is currently no methodology to enable this interrogation. Furthermore, there is no provision for the DNS to return the type of subscriber (for example, H.323 or SIP) to the S-CSCF so that it can take the appropriate action.

Thus, in a 3G-all-IP network, a subscriber can be addressed through a SIP URL/URI or an E.164 number. A SIP URL/URI takes the form of sip.user@domain. An E.164 number can represent a telephone number, a SIP subscriber, or an H.323 subscriber. When the E.164 number is entered, it is not known which one it represents, and each one must be translated by a different node. Thus, there are presently several very different address resolution schemes, and none of them are connected or coordinated in any way.

In order to overcome the disadvantage of existing solutions, it would be advantageous to have a system and method of address resolution in IP-based networks that provides a uniform methodology for address resolution. The present invention provides such a system and method.

SUMMARY OF THE INVENTION

In one aspect, the present invention is a method of address resolution in an Internet Protocol (IP)-based network that utilizes the Session Initiation Protocol (SIP) for call setup. The method includes the steps of receiving in a Resolver in the IP-based network, a call setup message from a requesting application, the call setup message including a destination address in a format other than an IP address. The Resolver then sends a DNS Query to a Domain Name Server (DNS), the DNS Query requesting an IP address associated with the destination address. The DNS then sends an answer to the Resolver that includes an IP address of a destination server and an indication of an application protocol supported by the destination server. The Resolver then determines whether the application protocol is SIP, and if so, the Resolver sends the IP address of the destination server to the requesting application. If the application protocol is not SIP, the Resolver sends an LS Query to a Location Server (LS), the LS Query requesting an IP address of a gateway function capable of converting SIP to the application protocol. The LS responds by sending the IP address of the gateway function to the Resolver, and the Resolver, in turn, sends the IP address of the gateway function to the requesting application.

In another aspect, the present invention is a unified method of address resolution in an IP-based network that includes a Telephone Routing for IP Protocol (TRIP) Framework, and that utilizes SIP for call setup. The method includes the steps of determining by a Resolver in the network, whether an address input by a requesting application is a Uniform Resource Locator/Uniform Resource Identifier (URL/URI) or an E.164 number. Upon determining that the input address is a URL/URI, the Resolver extracts a domain name from the URL/URI. Upon determining that the input address is an E.164 number, the Resolver converts the E.164 number into a domain name in ENUM format. A Domain Name Server (DNS) then determines whether it is able to translate the domain name into an IP address for a destination server. If the DNS is unable to translate the domain name, the Resolver uses an extended Location Server (LS) to obtain an IP address of a gateway function capable of interfacing with the destination server. The Resolver then returns the IP address of the gateway function to the requesting application. If the DNS is able to translate the domain name, the DNS sends to the Resolver, an IP address of either a global gateway function or the destination server along with an indication of an Application protocol supported by the destination server. The Resolver then determines whether the Application protocol is SIP. If the Application protocol is SIP, the Resolver returns the IP address of the destination server to the requesting application. If the Application protocol is not SIP, the Resolver ignores the IP address of the destination server and uses the extended LS to obtain an IP address of a gateway function capable of interfacing with the destination server. The Resolver then returns the IP address of the gateway function to the requesting application.

In yet another aspect, the present invention is a system for address resolution in an IP-based network that utilizes SIP for call setup. The system includes a Resolver that determines whether an address input by a requesting application is a URL/URI or an E.164 number, and queries other nodes in the network to determine an IP address for a destination server. The Resolver includes an extraction mechanism that extracts a domain name from an input URL/URI, a conversion mechanism that converts an input E.164 number to a domain name in ENUM format, a signaling logic mechanism that sends a domain name query to other nodes in the network and requests an IP address for the destination server, and a protocol analyzer that determines whether the destination server supports SIP. The system also includes at least one DNS that receives the domain name query from the Resolver and, if able, returns to the Resolver, the IP address for either a global gateway function or the destination server along with an Application protocol supported by the destination server. If unable to translate the domain name, the DNS returns to the Resolver an address of another DNS or an extended LS. The system also includes an extended LS that receives the domain name query from the Resolver and returns to the Resolver, an IP address of a gateway function capable of interfacing with the destination server.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 5 is a simplified block diagram of the system of the present invention.

DETAILED DESCRIPTION OF EMBODIMENTS

The system and method of the present invention allows 3G-all-IP operators to take advantage of the strengths of all three addressing methods. This is done by handling the three methods in an unified way, and by modifying a CSCF Resolver and the information stored in the DNS and LS. The CSCF Resolver is a client that interrogates the DNS. It may interrogate a first DNS which refers it to another DNS, or the first DNS can automatically propagate the interrogation on its own. The Resolver is an operating system component that is requested by various applications running on a host, to translate a DNS name. It is the component that performs the dialog with the DNS system.

The present invention provides the operator with full flexibility in defining its addressing resolution preferences, by providing the freedom to choose the most appropriate address translation method, for any specific call case. The present invention extends the functionality of the DNS to manipulate the data stored in the DNS to perform the various address resolutions. The data stored in the DNS is extended, and used in conjunction with the method of FIG. 1 to perform address resolutions.

Figure 1A:
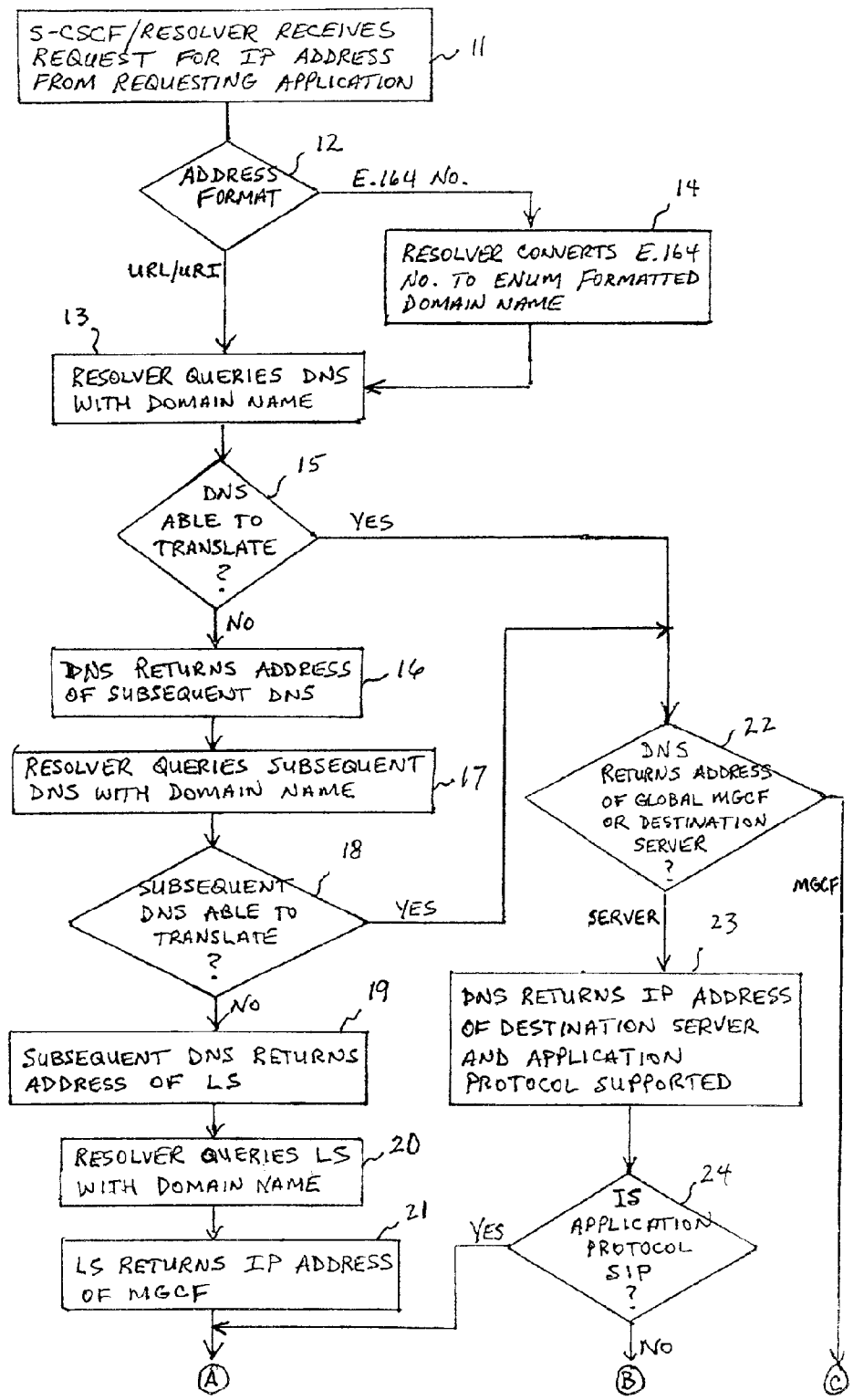
FIGS. 1A and 1B are portions of a flow chart illustrating the steps of the method of the present invention.
Figure 1B:
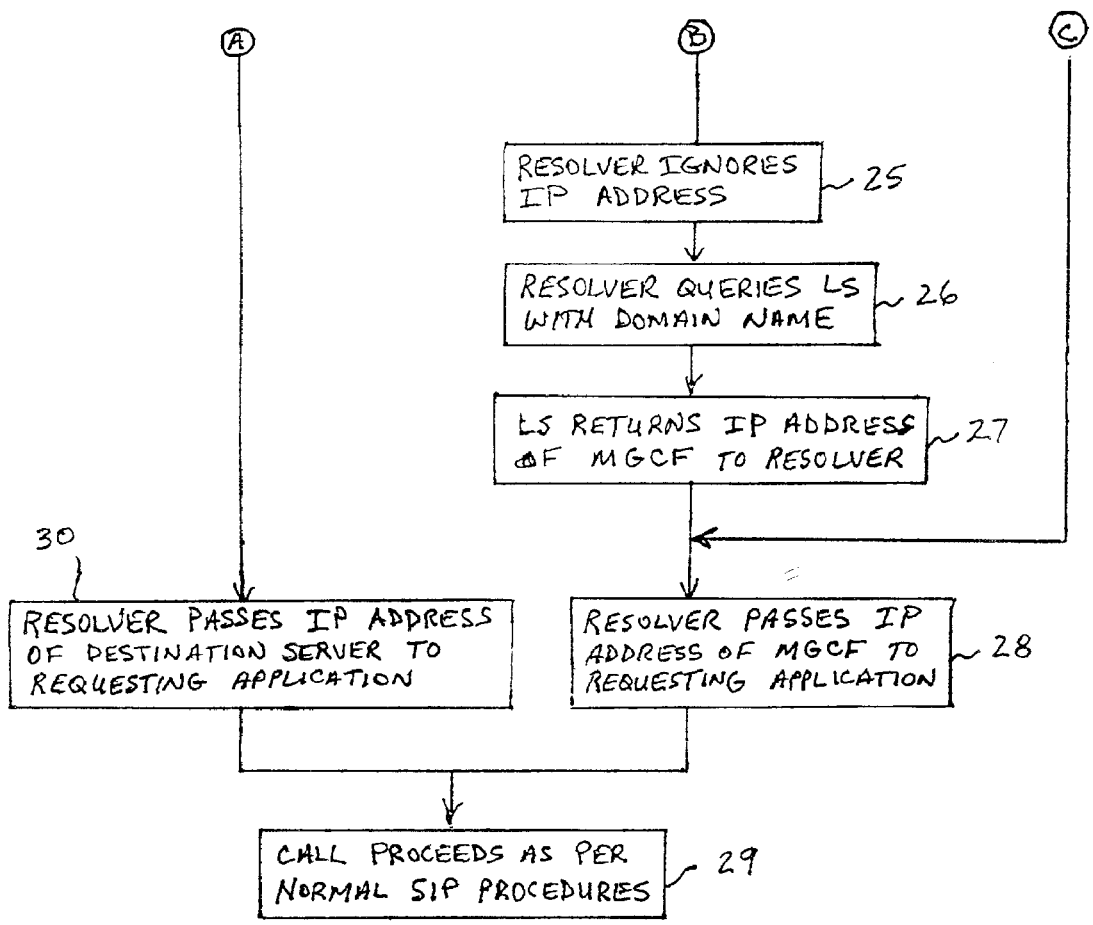

FIGS. 1A and 1B are portions of a flow chart illustrating the steps of the method of the present invention. Starting at step 11 of FIG. 1A, a Serving Call State Control Function (S-CSCF) having a Resolver implemented therewith receives a call setup message such as a SIP Invite message. The Invite message contains a destination address and requests that it be translated to an IP address. At step 12, the Resolver determines whether the received address is in URL/URI format, or is an E.164 number. The CSCF Resolver always sends the first interrogation to the local DNS. If the address is in a URL/URI format (for example, user@domain), then the Resolver queries the DNS with the domain name part of the address at step 13. IF the address is an E.164 number (for example, 987 657 3210), then the Resolver converts the E.164 number to a domain name in the ENUM format (for example, 0.1.2.3.4.5.6.7.8.9) at step 14, and then queries the DNS with the converted ENUM name.

At step 15, it is determined whether or not the DNS is able to translate the domain name in the query from the Resolver. Based on the configuration data defined by the local operator, if the DNS is unable to translate the domain name, the DNS may return the address of a subsequent DNS to be interrogated, or the address of an LS. In the example illustrated, the DNS responds at 16 by returning the address of a subsequent DNS to be interrogated. At step 17, the Resolver then queries the subsequent DNS with the domain name.

At step 18, it is determined whether or not the subsequent DNS is able to translate the domain name in the query from the Resolver. If not, in the example illustrated, the DNS responds at 19 by returning the address of an LS along with an indication that the address is for an LS. In the absence of this indication, the DNS and the Resolver may see the LS address as a subsequent DNS address. Only the local operator who set up this information knows that the address points to the LS. At step 21, the Resolver then queries the LS with the domain name, and at 22, the LS returns the IP address of an appropriate MGCF.

If it was determined at steps 15 or 18 that the DNS or subsequent DNS was able to translate the domain name, the method moves to step 22 where it is determined whether the DNS returns an IP address for a Global MGCF or a destination server. If the DNS returns the IP address of a destination server, the method moves to step 23 where the IP address is returned along with the Application protocol that the server supports. The method then moves to step 24 where the Resolver determines whether the Application protocol is SIP. If the Application protocol is not SIP, the method moves to FIG. 1B, step 25 where the Resolver ignores the IP address returned by the DNS. At 26, the Resolver queries the LS with the domain name since an MGCF is required. At step 27, the LS returns the IP address of an appropriate MGCF to the Resolver, and at step 28, the Resolver passes the IP address of the MGCF to the application that requested the address translation. At step 29, the call proceeds as per normal SIP procedures.

If it is determined at step 24 that the Application protocol is SIP, then the method moves directly to step 30 where the Resolver passes the IP address of the destination server to the requesting application. The method then moves to step 29 where the call proceeds as per normal SIP procedures. If it is determined at step 22 that the DNS returns the IP address of a Global MGCF, the method moves directly to step 28 where the Resolver passes the IP address of the MGCF to the application that requested the address translation. At step 29, the call proceeds as per normal SIP procedures.

This method implies the following modifications to the existing infrastructure:

A. The DNS should return the Application protocol supported by the node whose IP address is returned. This is mainly important for the conversion of E.164 numbers, which unlike URL/URIs, do not contain the application protocol information.

B. The Resolver should analyze the Application protocol returned together with the IP address. If this does not match the protocol supported by the requesting application, or a protocol specified by the configuration data, then the Resolver should contact the locally defined LS, since there is a need for an MGCF to perform the protocol conversion.

C. The operator may specify in the local DNS (the first point of contact for the Resolver) the domains for which the LS interrogation is needed. These DNS records should either return the LS address as the next DNS to be contacted, or another type of indication (for example, a flag) that the Local LS needs to be interrogated.

D. The LS should be able to indicate the appropriate MGCF even for the URL/URI-type of addresses. Today, the LS and the Telephone Routing for IP Protocol (TRIP) protocol are considered relevant to E.164 numbers only, because they were designed for connections to the PSTN. However, a 3GPP network should be able to communicate with non-SIP IP networks, such as H.323 networks, using the URL/URI-type of addressing. Thus, there is a need for selecting MGCFs based on a URL/URI.

Figure 2:
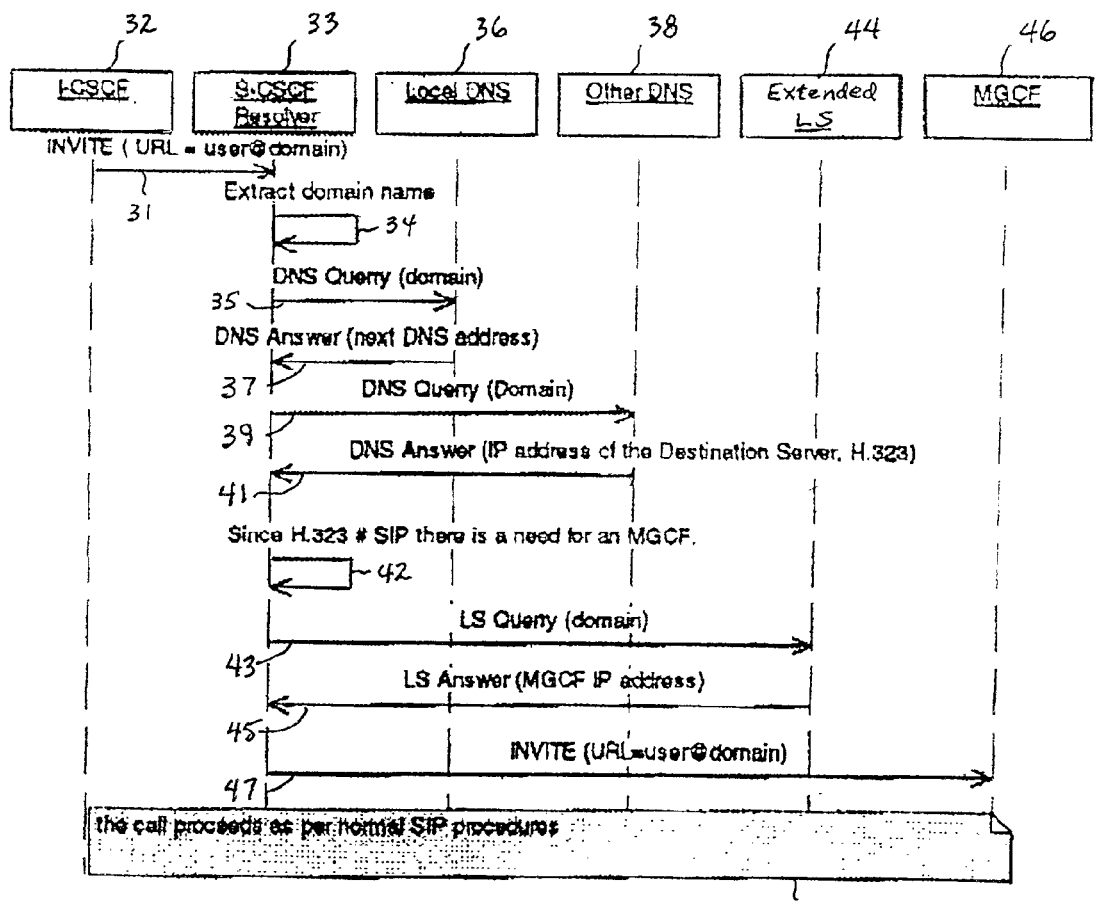
FIG. 2 is a signaling diagram illustrating the nodes of the system of the present invention and the signaling performed to resolve an IP address when a Uniform Resource Locator (URL) pointing to a non-SIP destination is input as the destination address.
Figure 3:
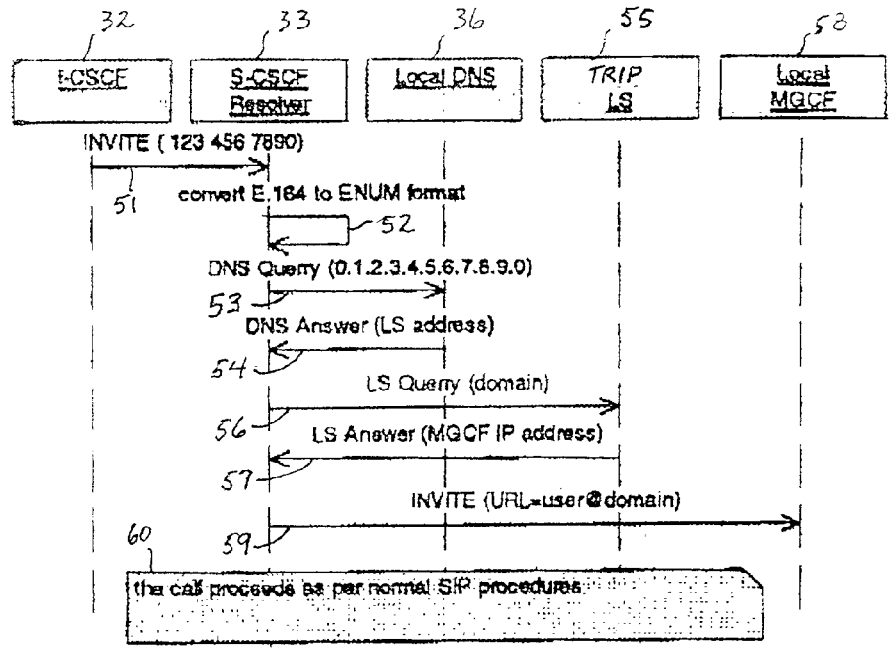
FIG. 3 is a signaling diagram illustrating the nodes of the system of the present invention and the signaling performed to resolve an IP address when an E.164 number is input as the destination address and is routed to a Local Media Gateway Control Function (MGCF) using the TRIP framework.
Figure 4:
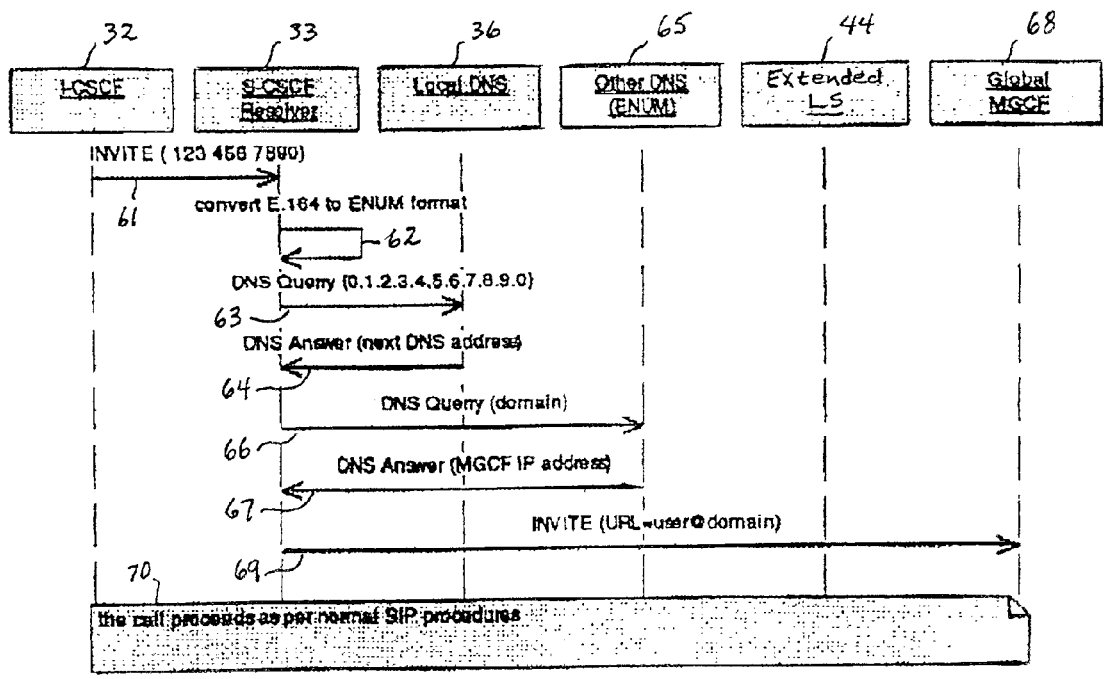
FIG. 4 is a signaling diagram illustrating the nodes of the system of the present invention and the signaling performed to resolve an IP address when an E.164 number is input as the destination address and is routed to an MGCF with global relevance.

FIGS. 2–4 are simplified signaling diagrams illustrating the use of the present invention for three specific call cases. The figures do not show all of the signaling that takes place during the address resolution, but just show the signaling that is pertinent to the present invention. FIG. 2 is a simplified signaling diagram illustrating the nodes of the system of the present invention and the signaling performed to resolve an IP address when a URL pointing to a non-SIP destination is input as the destination address. For example, the destination may be an H.323 URL. This case is not supported by the existing infrastructure.

At step 31, an Invite message is sent from an Interrogating CSCF (I-CSCF) 32 to a Serving CSCF/Resolver 33. The Invite message includes a URL address in the form of user@domain. At 34, the Resolver extracts the domain name, and at 35 sends a DNS Query with the domain name to the Local DNS 36. At 37, the Local DNS returns a DNS Answer telling the Resolver to go to a subsequent (Other) DNS 38 because the Local DNS does not know how to resolve the address. At 39, the Resolver then sends a DNS Query with the domain name to the Other DNS. At 41, the Other DNS returns a DNS Answer to the Resolver with an IP address of a Destination Server. The DNS Answer also identifies the type of application (i.e., the Application protocol) supported by the Destination Server. In the case illustrated in FIG. 2, the destination is an H.323 subscriber, and the DNS Answer identifies that the Destination Server supports H.323. It should be noted that today, there are no procedures defined for address resolution when a SIP terminal calls an H.323 terminal.

Since the originator is a SIP application, and the destination is an H.323 application, the Resolver 33 determines at 42 that there is a need for an MGCF to convert between SIP and H.323 signaling. At 43, the Resolver sends an LS Query with the domain name to a Location Server (LS) 44. This reflects an extension of the LS functionality since today, the LS only accepts E.164 numbers and returns IP addresses. The present invention extends the LS to accept domain names so that it can return the IP address of an MGCF that maps SIP to H.323. Thus, at 45 the LS sends an LS Answer to the Resolver with the IP address of an appropriate MGCF 46. The Resolver then sends an Invite message 47 to the MGCF which performs the SIP to H.323 conversion. At 48, the call proceeds as per normal SIP procedures.

FIG. 3 is a signaling diagram illustrating the nodes of the system of the present invention and the signaling performed to resolve an IP address when an E.164 number is input as the destination address and is routed to a Local Media Gateway Control Function (MGCF) using the TRIP framework. This is the typical case specified by the TRIP framework, and the scenario shows how it is integrated within the system of the present invention.

At step 51, an Invite message is sent from the I-CSCF 32 to the Serving CSCF/Resolver 33. The Invite message includes an E.164 number in the form of 123 456 7890. At 52, the Resolver converts the E.164 number to a domain name in ENUM format (e.g., 0.1.2.3.4.5.6. 7.8.9.0) using standard procedures. The Resolver then sends a DNS Query 53 to the Local DNS 36 with the ENUM-formatted name. At 54, the Local DNS returns a DNS Answer containing the address of an LS 55 that is TRIP capable, and instructing the Resolver to interrogate the TRIP LS because the Local DNS does not know how to resolve the address. At 56, the Resolver then sends an LS Query with the domain name to the TRIP LS. At 57, the TRIP LS returns an LS Answer to the Resolver with the IP address of a Local MGCF 58 because the destination address is a telephone number that needs to be delivered to the PSTN. The address is mapped from a telephone number to an appropriate Local MGCF for delivery to the PSTN. The Resolver then sends an Invite message 59 to the Local MGCF which converts the signaling from SIP to ISUP. At 60, the call then proceeds as per normal SIP procedures.

FIG. 4 is a signaling diagram illustrating the nodes of the system of the present invention and the signaling performed to resolve an IP address when an E.164 number is input as the destination address and is routed to an MGCF with global relevance. This is the typical case specified by the ENUM IETF working group, and the scenario shows how it is integrated within the system of the present invention.

At step 61, an Invite message is sent from the I-CSCF 32 to the Serving CSCF/Resolver 33. The Invite message includes an E.164 number. At 62, the Resolver converts the E.164 number to a domain name in ENUM format using standard procedures. The Resolver then sends a DNS Query 63 to the Local DNS 36 with the ENUM-formatted name. At 64, the Local DNS returns an Answer containing the address of a subsequent (Other) DNS (ENUM) 65 that supports the resolution of ENUM-formatted domain names because the Local DNS does not know how to resolve the address. The Resolver then sends a DNS Query 66 to the Other DNS (ENUM) with the domain name in ENUM format. The Other DNS (ENUM) returns a DNS Answer 67 that includes the IP address of a Global MGCF 68. The Global MGCF is an MGCF of global significance. The IP network operator may own the MGCF or may go through a broker. The broker must make the address of the MGCF known on the public Internet (i.e, it must be in the global DNS infrastructure). Thus, this process does not use an LS to obtain the MGCF address. At 69, the Resolver then sends an Invite message to the Global MGCF which converts the signaling from SIP to ISUP. At 70, the call then proceeds as per normal SIP procedures.

FIG. 5 is a simplified block diagram of the system of the present invention. The system includes the Resolver 33 which may be implemented with an S-CSCF, a DNS 71, and an extended LS 72. As illustrated, the DNS may represent the Local DNS 36, the Other DNS 38, or the Other DNS (ENUM) 65. The illustrated extended LS may represent the LS 44 or the TRIP LS 55, as modified by the present invention.

When an Invite message is received in the Resolver 33, decision logic 73 determines whether the address contained in the Invite message is a SIP URL/URI or an E.164 number. If the address is a URL/URI, it is passed to a Domain Name Extractor 74 which extracts the domain name and sends it to a Signaling Logic Mechanism 75. If the address is an E.164 number, it is passed to an E.164-to-ENUM Converter 76 which converts the E.164 number to a domain name in ENUM format and sends it to the Signaling Logic Mechanism.

The Signaling Logic Mechanism 75 sends a DNS query 77 to the DNS 71 and includes the domain name. When the domain name query is received in the DNS, translation logic 78 determines whether the DNS is able to translate the domain name into an IP address using an address translation table 79. If not, the DNS returns to the Resolver, the address of another DNS or an LS at 80. The address of an LS is distinguished from the address of a DNS with an indicator in the reply that the address is for an LS. If the DNS is able to translate the domain name, the DNS returns to the Resolver, the IP address of either the destination server, or a Global MGCF at 81. The address of the destination server is accompanied by the supported Application protocol, and the address of the Global MGCF is accompanied by an indication that the address is for an MGCF so that the Resolver can distinguish the address from that of a DNS. When the Resolver determines that it has received an IP address for the destination server, it utilizes a protocol analyzer 82 to determine whether or not the Application protocol is SIP. If the protocol is SIP, the Signaling Logic Mechanism 75 sends the IP address of the destination server to the requesting application at 86. If the Application protocol is not SIP, the Resolver ignores the IP address of the destination server and queries the extended LS 72 with the domain name.

If the Resolver 33 receives an address of another DNS from the DNS 71, the Resolver repeats the DNS query to the subsequent DNS. If the Resolver receives an address of an LS from the DNS, the Resolver queries the extended LS 72 with the domain name at 83. The LS checks its address database 84 and returns the IP address of an appropriate MGCF at 85. Once the Resolver receives the IP address for the MGCF, the IP address is passed to the S-CSCF for the requesting application at 86, and the call proceeds as per normal SIP procedures.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. In an Internet Protocol (IP)-based network utilizing Session Initiation Protocol (SIP) for call setup, a method of address resolution comprising the steps of:
    receiving in a Resolver in the IP-based network, a call setup message from a requesting application, said call setup message including a destination address in a format other than an IP address;
    sending a DNS Query from the Resolver to a Domain Name Server (DNS), said DNS Query requesting an IP address associated with the destination address;
    sending an answer from the DNS to the Resolver, said answer including an IP address of a destination server and an indication of an Application protocol supported by the destination server;
    determining in the Resolver whether the Application protocol is SIP; and
    upon determining that the Application protocol is SIP, sending the IP address of the destination server from the Resolver to the requesting application.

2. The method of address resolution of claim 1 further comprising, upon determining that the Application protocol is not SIP, the steps of:
    sending an LS Query from the Resolver to a Location Server (LS), said LS Query including a domain name as the destination address and requesting an IP address of a gateway function capable of converting SIP to the Application protocol;
    sending the IP address of the gateway function from the LS to the Resolver; and
    sending the IP address of the gateway function from the Resolver to the requesting application.

3. The method of address resolution of claim 1 further comprising, after the step of sending a DNS Query from the Resolver to the DNS, the steps of:
    determining in the DNS that the DNS cannot resolve the address;
    sending an answer from the DNS to the Resolver that includes an address for a subsequent DNS; and
    sending a second DNS Query from the Resolver to the subsequent DNS.

4. The method of address resolution of claim 1 further comprising, after the step of sending a DNS Query from the Resolver to the DNS, the steps of:
    determining in the DNS that the DNS cannot resolve the address; and
    sending a second DNS Query from the DNS to a subsequent DNS.

5. The method of address resolution of claim 1 wherein the destination address is in the format of a Uniform Resource Locator/Uniform Resource Identifier (URL/URI), and the method further comprises extracting by the Resolver, a domain name from the URL/URI and including the domain name in the DNS Query sent from the Resolver to the DNS.

6. The method of address resolution of claim 1 wherein the destination address is in the format of an E.164 number (ENUM), and the method further comprises converting by the Resolver, the E.164 number into a domain name in ENUM format and including the ENUM-formatted domain name in the DNS Query sent from the Resolver to the DNS.

7. A unified method of address resolution in an Internet Protocol (IP)-based network that includes a Telephone Routing for IP Protocol (TRIP) Framework, and that utilizes Session Initiation Protocol (SIP) for call setup, said method comprising the steps of:
    determining by a Resolver in the network, whether an address input by a requesting application is a Uniform Resource Locator/Uniform Resource Identifier (URL/URI) or an E.164 number;
    upon determining that the input address is a URL/URI, extracting by the Resolver, a domain name from the URL/URI;
    upon determining that the input address is an E.164 number, converting by the Resolver, the E.164 number into the domain name in ENUM format;
    determining whether a Domain Name Server (DNS) is able to translate the domain name into an IP address for a destination server;
    upon determining that the DNS is unable to translate the domain name:
        using by the Resolver, a Location Server (LS) to obtain an IP address of a gateway function capable of interfacing with the destination server; and
        returning the IP address of the gateway function from the Resolver to the requesting application;
    upon determining that the DNS is able to translate the domain name:
        sending from the DNS to the Resolver, an IP address of the destination server and an indication of an Application protocol supported by the destination server;
        determining by the Resolver whether the Application protocol is SIP;
        upon determining that the Application protocol is SIP, returning the IP address of the destination server from the Resolver to the requesting application; and
        upon determining that the Application protocol is not SIP:
            using by the Resolver, an LS to obtain an IP address of a gateway function capable of interfacing with the destination server; and
            returning the IP address of the gateway function from the Resolver to the requesting application.

8. The unified method of address resolution of claim 7 further comprising, after the step of sending from the DNS to the Resolver, the IP address of the destination server and the indication of the Application protocol supported by the destination server, the steps of:
    determining by the Resolver whether the Application protocol supported by the destination server matches a protocol supported by the requesting application;
    sending the IP address of the destination server to the requesting application, upon determining that the Application protocol supported by the destination server matches the protocol supported by the requesting application; and
    requesting the IP address of the gateway function capable of interfacing with the destination server from the Local LS, upon determining that the Application protocol supported by the destination server does not match the protocol supported by the requesting application.

9. The unified method of address resolution of claim 7 wherein the step of using by the Resolver, an LS to obtain an IP address of a gateway function capable of interfacing with the destination server includes sending the domain name to an extended LS that is modified to receive a domain name and return an IP address of a gateway function.

10. The unified method of address resolution of claim 7 wherein the step of determining whether the DNS is able to translate the domain name into the IP address for the destination server includes determining by the DNS whether operator-specified information in the DNS indicates that the domain name is one for which an interrogation of an LS is required.

11. The unified method of address resolution of claim 10 further comprising, upon determining by the DNS that operator-specified information in the DNS indicates that the domain name is one for which an interrogation of the LS is required, the step of indicating in a response to the Resolver that an address of an LS is being returned so that the Resolver can query the LS utilizing a protocol appropriate for an LS.

12. A system for address resolution in an Internet Protocol (IP)-based network that utilizes Session Initiation Protocol (SIP) for call setup, said system comprising:
   a Resolver that determines whether an address input by a requesting application is a Uniform Resource Locator/ Uniform Resource Identifier (URL/URI) or an E.164 number, and queries other nodes in the network to determine an IP address for a destination server, said Resolver including:
     an extraction mechanism that extracts a domain name from an input URL/URI;
     a conversion mechanism that converts an input E.164 number to a domain name in ENUM format; and
     a signaling logic mechanism that sends a domain name query to other nodes in the network and requests an IP address for the destination server;
   at least one Domain Name Server (DNS) that receives the domain name query from the Resolver and, if able to translate the domain name, returns to the Resolver, the IP address for the destination server, and if unable to translate the domain name, returns to the Resolver an address of a Location Server (LS); and
   an extended Location Server (LS) that receives the domain name query from the Resolver and returns to the Resolver, an IP address of a gateway function capable of interfacing with the destination server.

13. The system for address resolution of claim 12 wherein the DNS, if able to translate the domain name, also returns to the Resolver, an indication of an Application protocol supported by the destination server, and the Resolver includes a protocol analyzer that analyzes the Application protocol to determine whether the Application protocol is SIP.

14. The system for address resolution of claim 13 wherein the signaling logic mechanism sends the IP address of the destination server to the requesting application upon receiving an indication from the protocol analyzer that the Application protocol is SIP.

15. The system for address resolution of claim 14 wherein the signaling logic mechanism sends the domain name query to the extended LS upon receiving an indication from the protocol analyzer that the Application protocol is not SIP.

16. The system for address resolution of claim 13 wherein the DNS, if unable to translate the domain name, also returns to the Resolver, an indication that an address of an LS is being returned so that the Resolver can query the LS utilizing a protocol appropriate for an LS.

17. The system for address resolution of claim 13 wherein the DNS is able to translate the domain name to an address of a global gateway function, and the DNS returns to the Resolver, the address of the global gateway function and an indication that an address of a gateway function is being returned so that the Resolver can distinguish the returned address from an address of another DNS.

18. A Domain Name Server (DNS) for use in a system for translating domain names into Internet Protocol (IP) addresses, said system also including a Resolver associated with a Serving Call State Control Function (S-CSCF) that sends domain name queries to the DNS requesting translation, and an Extended Location Server (LS) that receives domain name queries from the Resolver and returns IP addresses of gateway functions to the Resolver, said DNS comprising:
   an address translation table; and
   address translation logic that determines whether the domain name received from the Resolver can be translated using the address translation table, determines an appropriate response from a plurality of possible responses to the Resolver, and sends the appropriate response to the Resolver, said possible responses including:
     an IP address of another DNS, upon determining that the domain name received from the Resolver cannot be translated;
     an IP address of the Extended LS along with an indication that the returned address is for an LS, upon determining that the domain name received from the Resolver cannot be translated;
     an IP address of a destination server along with an Application protocol supported by the destination server, upon determining that the domain name received from the Resolver can be translated; and
     an IP address of a global gateway function along with an indication that the returned address is for a gateway function, upon determining that the domain name received from the Resolver can be translated.

* * * * *

UNITED STATES PATENT AND TRADEMARK OFFICE
CERTIFICATE OF CORRECTION

PATENT NO. : 6,917,612 B2  Page 1 of 1
APPLICATION NO. : 09/852536
DATED : July 12, 2005
INVENTOR(S) : George Foti et al.

It is certified that error appears in the above-identified patent and that said Letters Patent is hereby corrected as shown below:

On the Face Page, Field (73), under "Assignee", in Column 1, Line 1, delete "Telefonaktiebolaged" and insert -- Telefonaktiebolaget --, therefor.

Signed and Sealed this

Eighth Day of April, 2008

JON W. DUDAS
*Director of the United States Patent and Trademark Office*